United States Patent [19]

Bell, Jr.

[11] Patent Number: 4,643,528
[45] Date of Patent: Feb. 17, 1987

[54] ENCAPSULATED LIQUID CRYSTAL AND FILLER MATERIAL
[75] Inventor: James R. Bell, Jr., Pepper Pike, Ohio
[73] Assignee: Manchester R & D Partnership, Pepper Pike, Ohio
[21] Appl. No.: 712,966
[22] Filed: Mar. 18, 1985
[51] Int. Cl.[4] .............................................. G02F 1/13
[52] U.S. Cl. .................................. 350/334; 350/344; 350/320
[58] Field of Search ............... 350/334, 344, 341, 349, 350/350 R, 320

[56] References Cited

U.S. PATENT DOCUMENTS

3,499,702  3/1970  Goldmacher et al. ..... 350/350 R X
3,551,026  12/1970  Heilmeier ........................... 350/349
4,435,047  3/1984  Fergason ............................ 350/334

Primary Examiner—Michael L. Gellner
Assistant Examiner—Brian W. Brown
Attorney, Agent, or Firm—Renner, Otto, Boisselle & Lyon

[57] ABSTRACT

A liquid crystal apparatus includes a plurality of volumes of liquid crystal material in a containment medium. At least some of the volumes also have a filler or spacer material therein. Some volumes may be interconnected. The walls defining the volumes and the wall of the spacer tend to distort the natural liquid crystal structure in the absence of an electric field, and the optical and electrical properties of the materials are such that in the absence of a field incident light is scattered or absorbed and in the presence of a field, scattering and/or absorption are reduced. The apparatus may be used in an optical display, optical shutter, billboard, etc., and it functions independently of polarization. Methods of making and using the apparatus also are included in the invention.

8 Claims, 13 Drawing Figures

ENCAPSULATED LIQUID CRYSTAL AND FILLER MATERIAL

CROSS REFERENCE TO RELATED APPLICATION

Reference is made to U.S. Pat. No. 4,435,047 and to copending U.S. patent applications Ser. No. 477,138, filed Mar. 21, 1983, for "Enhanced Scattering In Voltage Sensitive Encapsulated Liquid Crystal", Ser. No. 477,242, filed Mar. 21, 1983, for "Encapsulated Liquid Crystal And Method", and Ser. No. 585,883, filed Mar. 2, 1984, for "Encapsulated Liquid Crystal Material, Apparatus and Method", the entire disclosures of which are hereby incorporated by reference.

TECHNICAL FIELD

The present invention relates generally to liquid crystals and, more particularly, to encapsulated liquid crystals with filler or spacer materials. Moreover, the invention relates to devices using such encapsulated liquid crystals and to methods of making such encapsulated liquid crystals and devices. The invention also relates to an improvement for the inventions disclosed in the aforementioned patent and applications.

BACKGROUND

Liquid crystals currently are used in a wide variety of devices, including optical devices such as visual displays. Such devices usually require relatively low power and have a satisfactory response time, provide reasonable contrast, and are relatively economical. The property of liquid crystals enabling use, for example, in visual displays, is the ability of liquid crystals to transmit light on one hand, and to scatter and/or absorb light, on the other, depending on the alignment (or lack of alignment) of the liquid crystal structure with respect to a prescribed input, e.g. an electric field applied across the liquid crystal material. An example of electrically responsive liquid crystal material and use thereof is provided in U.S. Pat. No. 3,322,485.

The invention of the present application is disclosed hereinafter particularly with reference to the use of liquid crystal material that is particularly responsive to a prescribed input preferably of the electromagnetic type, and, more particularly, to an electric field.

Various principles of the invention may be employed with various one or ones of the other known types of liquid crystal material or combinations thereof. The various characteristics of the cholesteric, nematic and smectic types of liquid crystal material are described in the prior art.

To enhance contrast and possibly other properties of liquid crystal material, pleochroic dyes have been mixed with the liquid crystal material to form a solution therewith. The molecules or structure of the pleochroic dye generally aligns with the molecules or structure of the liquid crystal material. Examples of the use of pleochroic dyes with liquid crystal material are described in U.S. Pat. Nos. 3,499,702 and 3,551,026.

An important characteristic of liquid crystal material is anisotropy. An anisotropic material has different physical properties in different directions. For example, liquid crystals are optically anisotropic i.e. they have indices of refraction which vary with the direction of propagation and polarization of the incident light.

Liquid crystal material also has electrical anisotropy. For example, the dielectric constant for nematic liquid crystal material may be one value when the liquid crystal structure is parallel to the electric field and may have a different value when the liquid crystal structure is aligned perpendicular to an electric field. Since such dielectric value is a function of alignment, for example, reference to the same as a "dielectric coefficient" may be more apt than the usual "dielectric constant" label. Similar properties are true for other types of liquid crystals.

A pleochroic display, i.e. one in which pleochroic dye and liquid crystal material are in solution together, has the advantage of not requiring the use of a polarizer. However, such a pleochroic device has a disadvantage of relatively low contrast when only nematic liquid crystal material is used. It was discovered in the past, though, that a cholesteric liquid crystal could be added to the nematic one together with the dye to improve the contrast ratio. See White et al article, "*Journal of Applied Physics*", Volume 45, No. 11, November 1974, at pages 4718–4723, for example. The cholesteric material would tend not to return to its original zero field form when the electric field is removed.

As used herein the term "liquid crystal" material may mean[s] the liquid crystals themselves and, depending on context, the pleochroic dye and/or other additives in solution or otherwise included therewith.

BRIEF SUMMARY OF THE INVENTION

Briefly, according to one aspect of the invention, volumes of liquid crystal material in a containment medium, e.g. as encapsulated liquid crystal material, include filler or spacer material, preferably of non-liquid crystal material, to accomplish one or more results, including, for example, a reduction in the required amount of liquid crystal in the volumes or capsules while still being able to accomplish desired optical effects, such as selective scattering or absorption of light or transmission of light, reduction in the amount or magnitude of electric input, such as electric field, to effect prescribed response of the liquid crystal material, and other results or features, as well, as will become more apparent from the description herein; according to another aspect the encapsulated liquid crystal material is used in liquid crystal devices, such as relatively large size visual display devices and optical shutters; and according to further aspects there are provided methods for encapsulating liquid crystal material and for making a liquid crystal device using such encapsulated liquid crystal material.

Another feature of the invention is the ability to reduce the amount of liquid crystal material needed in a given capsule volume, while preferably also improving operation. These are accomplished by using a filler or spacer material in the capsule. An exemplary filler may be capsules of mineral oil or other relatively inert, non-liquid crystal material or glass beads. Such fillers are of a size, e.g. diameter, smaller than the internal diameter of the capsule or volume containing the same and the liquid crystal material. The filler both reduces the amount of liquid crystal material required to fill a capsule and may provide another surface by which curvilinear alignment of the liquid crystal structure is effected. Also, if the filler is optically transparent and the index of refraction of the filler is matched with, e.g. the same as, that of the ordinary index of refraction of the liquid crystal, in the presence of an electric field the filler will be at least substantially transparent. (If the filler is colored, it can be used to color light transmitted therein.) Further, if the index of refraction of the filler and the extraordinary index of refraction of the liquid crystal material are different, such filler would enhance scattering by refraction at the interface with the liquid crystal material in the absence of an electric field. Moreover, the filler preferably reduces the electrical requirements of the encapsulated liquid crystal material to saturate to full transparency, or in any event to minimum scattering or absorption operation and preferably also reduces the other operational electrical requirements of the encapsulated or volumes of liquid crystal.

Some terms used herein generally are defined as follows: "liquid crystal material" broadly refers to any type of liquid crystal material that will work in the context of the present invention, but preferably refers to operationally nematic liquid crystal material. By "operationally nematic" is meant that, in the absence of external fields, structural distortion of the liquid crystal is dominated by the orientation of the liquid crystal at its boundaries rather than by bulk effects, such as very strong twists (as in cholesteric material) or layering (as in smectic material). Thus, for example, an otherwise operationally nematic liquid crystal having also chiral ingredients which induce a tendency to twist but cannot overcome the effects of boundary alignment would still be considered operationally nematic. Operationally nematic liquid crystal material may include pleochroic dyes, chiral compounds, or other co-ingredients. The boundary which affects such orientation may be a surface, and, therefore, reference to boundary effect or surface effect may be used equivalently herein. Such boundary or surface may be a wall of a device or medium which contains the liquid crystal, such as a capsule, containment medium, or the like. Operationally nematic also, of course, includes nematic liquid crystal. The liquid crystal should have positive dielectric anisotropy.

A capsule refers to a containment device or medium that contains or confines a quantity of liquid crystal material, and "encapsulating medium" or "material" is that medium or material of which such capsules are formed. An "encapsulated liquid crystal" or "encapsulated liquid crystal material" means a quantity of liquid crystal material confined or contained in volumes within the encapsulating medium, for example in a solid medium as individual capsules or dried stable emulsions. Such volumes may be individual isolated discrete volumes, i.e. once formed, they ordinarily remain as individually distinct entities or separate entities or such separate entities or discrete volumes may be interconnected, for example by one or more passages. Preferably liquid crystal material would be in both the discrete volumes and in such interconnecting passages. Thus, as used herein "capsule" or "volume" may refer to either a closed individual capsule or a capsule that is interconnected to another such that, for example, the internal volumes of respective interconnected passages are fluidically coupled via one or more of the mentioned interconnecting passages. "Capsule" and "volume" may be used equivalently and interchangeably herein.

Capsules according to this invention generally have an approximately spherical configuration (though this is not, per se, a requisite of the invention) having a diameter from about 0.3 to 100 microns, preferably 1 to 30 microns, especially 1 to 5 microns. In the context of this invention, encapsulation and like terms refer not only to the formation of such articles as are generally referred to as capsules, but also to the formation of stable emulsions or dispersions of the liquid crystal material in an agent (an encapsulating medium) which results in the formation of stable, preferably approximately uniformly sized, particles in a uniform surrounding medium, each or at least a plurality of which includes a spacer or filler material therein. The above-mentioned interconnecting passages also may exist between otherwise separate capsule-like particle volumes in such medium and preferably likewise would contain liquid crystal material. Techniques for encapsulation, generally referred to as microencapsulation because of the capsule size, are well known in the art (see, e.g., "Microcapsule Processing and Technology" by Asaji Kondo, published by Marcel Dekker, Inc.) and it will be possible for one skilled in the art, having regard to the disclosure herein, to determine suitable encapsulating agents and methods for liquid crystal materials.

In one example of the invention each capsule includes a generally centrally located spacer and liquid crystal material annularly spherically filling the remainder of the capsule. Alternatively, more than one spacer may be included in a given capsule.

A liquid crystal device is a device formed of liquid crystal material. In the present invention such devices are formed of encapsulated liquid crystals capable of providing a function of the type typically inuring to liquid crystal material; for example, such a liquid crystal device may be a visual display or an optical shutter that in response to application and removal of an electric field effects a selected attenuation of optical radiation, preferably including from far infrared through ultraviolet wavelengths. The invention may be used in connection with optical radiation, light or any other electromagnetic radiation or waves such that the liquid crystal in response to the presence or not of a prescribed input will cause a detectable variation, e.g. attenuation, transmission, etc.

One method of making encapsulated liquid crystals includes mixing together liquid crystal material and an encapsulating medium in which the liquid crystal material will not dissolve and permitting formation of discrete capsules containing the liquid crystal material.

A method of making a liquid crystal device including such encapsulated liquid crystal includes, for example applying such encapsulated liquid crystal material to a substrate. Moreover, such method may include providing means for applying an electric field to the liquid crystal material to affect a property thereof.

According to another feature of the invention an operationally nematic material in which is dissolved a pleochroic dye is placed in a generally spherical cpasule. In the absense of an electric field, the capsule wall distorts the liquid crystal structure so it and the dye will tend to absorb light regardless of its polarization direction. When a suitable electric field is applied across such a capsule, for example across an axis thereof, the liquid crystal material will tend to align parallel to such field causing the absorption characteristic of such material to be reduced to one assumed when the liquid crystal material is in the planar configuration.

The spacer or filler material in the capsules should be of a material having electrical characteristics that preferably reduce the magnitude of electrical input, e.g. electric field, required to effect a desired optical affect on light incident on the capsule, viz. scattering, absorption or transmission.

Contrast of a liquid crystal device employing encapsulated liquid crystals may be improved by selecting an encapsulating medium and spacer material that have indices of refraction that are matched to the ordinary index of refraction of the liquid crystal material (i.e. the index of refraction parallel to the optical axis of the crystal). See, e.g. "Optics" by Borne & Wolf, or "Crystals and the Polarizing Microscope" by Hartshorne & Stewart. The encapsulating medium may be used not only to encapsulate liquid crystal material but also to adhere the capsules to a substrate for support thereon. Alternatively, a further binding medium may be used to hold the liquid crystal capsules relative to a substrate. In the latter case, though, preferably the additional binding medium has an index of refraction which is matched to that of the encapsulating medium for maintaining the improved contrast characteristic described above.

A feature of the spherical or otherwise curvilinear surfaced capsule which confines the liquid crystal material therein in accordance with the present invention is that the liquid crystal material tends to follow the curvature or otherwise to align itself generally parallel with the curved surfaces of such capsule. Accordingly, the liquid crystal structure tends to be forced or distorted to a specific form, being folded back on itself in a sense as it follows the capsule wall, so that the resulting optical characteristic of a given capsule containing liquid crystal material is such that substantially all light delivered thereto will be affected, for example, scattered (when no pleochroic dye is present) or absorbed (when pleochroic dye is present), when no electric field is applied, regardless of the polarization direction of the incident light. Even without dye this effect can cause scattering and thus opacity. Scattering would be due in large part to the refraction of light since the extraordinary index of refraction of the liquid crystal material preferably is different from the indices of refraction of the encapsulating medium and filler material; absorption would be due in large part to the absorbing characteristic of the dye vis-a-vis such scattered light. In the presence of a prescribed input, say an electric field, though, the liquid crystal structure aligns with the field and effectively becomes optically transmissive with respect to or at least reduces the amount of scattering and/or absorption of incident light, as is described in greater detail below.

It has been discovered, too, that in the absence of a prescribed input (electric field) the liquid crystal structure of operationally nematic liquid crystal material may align generally normal to the surface, e.g. the inner wall of a capsule, at such surface instead of parallel thereto. The same may be true with respect to alignment of the liquid crystal structure relative to the filler material. Thus, such structure on average would not be aligned with the direction of incident light. Also, due to the limited volume of the capsule, the structure of the liquid crystal that is spaced away from such surface or wall will be curved or distorted. Therefore, in the absence of the prescribed input (electric field) such encapsulated liquid crystal functions substantially the same as does that which encounters parallel alignment with the capsule wall; and the same is true for transmissive operation in the presence of the prescribed inut. Similar operation would occur, too, if some of the liquid crystal were parallel and some normal to the surface or capsule wall.

Another feature is the ability to control the effective thickness of the liquid crystal material contained in a capsule by controlling the internal diameter of such capsule. Such diameter control may be effected by a size fractionation separation process during the making of the encapsulated liquid crystals using any one of a variety of conventional or novel sorting techniques as well as by controlling the mixing process, the quantities of ingredients, and/or the nature of the ingredients provided during mixing. By controlling such thickness parameter to relatively close tolerances, then, the subsequent tolerance requirements when the final liquid crystal device is made using the encapsulated liquid crystals will not be as critical as was required in the past for non-encapsulated devices.

However, a further and very significant feature of the present invention is that there appears to be no limitation on the size of a high quality liquid crystal device that can be made using the encapsulated liquid crystals in accordance with the present invention. More specifically, by providing for confinement of discrete quantities of liquid crystal material, for example, in the described capsules, the various problems encountered in the past that prevented the use of liquid crystal material in large size devices are overcome, for each individual capsule in effect can still operate as an independent liquid crystal device. Such operation still has been found effective even with the existence of the mentioned interconnecting passages between respective capsules or capsule-like volumes. Indeed all of the aspects and features of the present invention vis-a-vis individual unconnected capsules have been found to be applicable to arrangement of capsules that have one or more interconnecting passages. Moreover, each capsule preferably has physical properties enabling it to be mounted in virtually any environment including one containing a plurality of further such liquid crystal capsules mounted to a substrate or otherwise supported for use in response to application and removal of some type of excitation source, such as, for example, an electric or magnetic field. This feature also enables placement of the liquid crystal material on only selected areas of the optical device, such as in large size displays (e.g. billboards), optical shutters, etc.

Important considerations in accordance with the invention include that the encapsulating or containment medium, filler material and liquid crystal material have electrical and optical properties matched in a prescribed way to permit efficient and high quality functioning of the liquid crystal material in response to excitation or non-excitation by a external source; and that the interaction of the encapsulating medium and filler with the liquid crystal material distorts the latter in a prescribed manner changing an operational mode of liquid crystal material. Regarding the latter, by forcing the liquid crystal structure to distort into generally parallel or conforming alignment with the capsule wall, the liquid crystals will absorb or block, rather than transmit, light when not subject to an electric field and will be functional with respect to all manners of incident light regardless of the direction of polarization, if any, of such incident light.

According to one aspect of the invention, there is provided in combination, liquid crystal material having a natural structure, a containment material for containing the liquid crystal material ina plurality of volumes, a spacer for occupying some of the space in a plurality of the volumes, at least one of the containment material and spacer distorting such natural structure of at least some of said liquid crystal material in the absence of a prescribed input.

According to another aspect, a liquid crystal apparatus, includes liquid crystal material, containment medium containing plural volumes of the liquid crystal material, and non-liquid crystal filler in a plurality of the volumes, the liquid crystal material being operationally nematic liquid crystal having positive dielectric anisotropy, an extraordinary index of refraction different from that of at least one of the containment medium and filler to at least one of scatter and absorb light in the absence of a prescribed input and an ordinary index of refraction matched to that of at least one of the containment medium and filler, whereby in the presence of such prescribed input the amount of such scattering or absorption is reduced.

According to an additional aspect, a liquid crystal apparatus includes a plurality of volumes of liquid crystal in a containment medium, the liquid crystal being distorted from the natural structure thereof in the absence of an electrical input to scatter or to absorb light and being responsive to such an electrical input to reduce such scattering or absorption, and a filler, spacer or other means in the volumes for reducing the magnitude of electrical input required to effect a desired amount of reduction of such scattering or absorption.

According to a further aspect, a liquid crystal apparatus, includes plural volumes of liquid crystal in a containment medium, the liquid crystal having positive dielectric anisotropy, an extraordinary index of refraction different from the index of refraction of such containment medium to scatter or to absorb light in the absence of a prescribed input, and an ordinary index of refraction substantially matched to the index of refraction of the containment medium to reduce such scattering or absorption in the presence of such prescribed input, and further comprising a filler in the volumes in addition to the liquid crystal and having an index of refraction that is substantially matched to the ordinary index of refraction of the liquid crystal and different from the extraordinary of the liquid crystal to increase scattering of light in the absence of such prescribed input and to have a relatively minimum effect on light in the presence of such prescribed input.

According to still another aspect, a method of affecting the natural structure of liquid crystal material includes containing such liquid crystal material in a plurality of volumes, using a spacer to occupy some of the space in a plurality of such volumes, and using at least one of the walls of such volumes and such spacer distorting such natural structure of at least some of such liquid crystal material in the absence of a prescribed input.

According to still an additional aspect, a method of scattering or absorbing selected amounts of light using liquid crystal apparatus, includes containing liquid crystal material in plural volumes, and providing non-liquid crystal filler in a plurality of the volumes, wherein such liquid crystal material comprises operationally nematic liquid crystal having positive dielectric anisotropy, an extraordinary index of refraction different from that of at least one of the containment medium and filler, at least one of scattering and absorbing light in the absence of a prescribed input and an ordinary index of refraction matched to that of at least one of the containment medium and filler, whereby in the presence of such prescribed input the amount of such scattering or absorption is reduced.

According to still a further aspect, a method of reducing the electrical input requirements for operating a liquid crystal apparatus, includes providing a plurality of volumes of liquid crystal in a containment medium, distorting such liquid crystal from the natural structure thereof in the absence of an electrical input to scatter or to absorb light, such liquid crystal being responsive to such an electrical input to reduce such scattering or absorption, and placing a spacer in such volumes to reduce the magnitude of electrical input required to effect a desired amount of reduction of such scattering or absorption.

According to yet another aspect of the invention, a method of enhancing the scattering or absorption by liquid crystal while reducing the amount of liquid crystal required to affect light, includes providing plural volumes of liquid crystal in a containment medium, such liquid crystal having positive dielectric anisotropy, an extraordinary index of refraction different from the index of refraction of such containment medium to scatter or to absorb light in the absence of a prescribed input, and an ordinary index of refraction substantially matched to the index of refraction of such containment medium to reduce such scattering or absorption in the presence of such prescribed input, and further including providing a filler in such volumes in addition to such liquid crystal and having an index of refraction that is substantially matched to the ordinary index of refraction of such liquid crystal and different from the extraordinary of such liquid crystal to increase scattering of light in the absence of such prescribed input and to have a relatively minimum affect on light in the presence of such prescribed input.

These and aspects, features, other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawing setting forth in detail a certain illustrative embodiment of the invention, this being indicative, however, of but one of the various ways in which the principles of the invention may be suitably employed.

DESCRIPTION OF THE PREFERRED EMBODIMENT

Figures 1, 2:
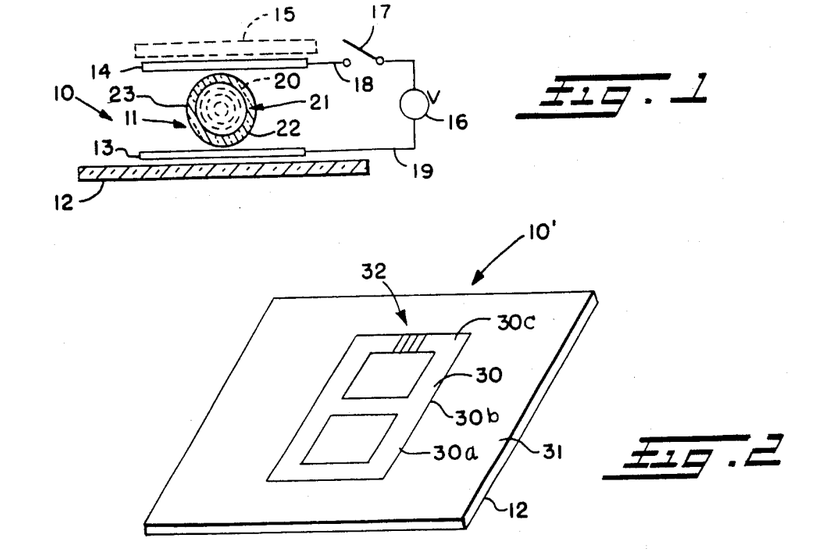
FIG. 1 is a schematic representation of a liquid crystal device in accordance with the present invention.
FIG. 2 is an isometric view of a liquid crystal display device in accordance with the present invention.

Turning now to FIG. 1, an improved liquid crystal device in accordance with the present invention is indicated at 10. The device 10 includes an encapsulated liquid crystal 11 which is supported by a mounting substrate 12 across which an electric field may be applied via electrodes 13, 14.

The electrode of 13 may be, for example, a quantity of vacuum deposited indium tin oxide applied to the substrate 12, and the electrode 14 may be, for example, electrically conductive ink. A protective layer or coating 15 may be applied over the electrode 14 for protective purposes but such layer 15 ordinarily would not be necessary for supporting or confining the encapsulated liquid crystal 11 or the electrode 14. Voltage may be applied to the electrodes 13, 14 from an AC or DC voltage source 16, selectively closable switch 17, and electrical leads 18, 19 in turn to apply an electric field across the encapsulated liquid crystal 11 when the switch 17 is closed.

The encapsulated liquid crystal 11 includes liquid crystal material 20 contained within the confines or interior volume 21 of a capsule 22. Preferably the capsule 22 is generally spherical. However, the principles of the invention would apply when the capsule 22 is of a shape other than spherical. Such shape should provide the desired optical and electrical characteristics that will satisfactorily coexist with the optical characteristics of the liquid crystal 20, e.g. index of refraction, and will permit an adequate portion of the electric field to occur across the liquid crystal material 20 itself for effecting desired alignment of the liquid crystal structure when it is desired to have a field on condition.

The mounting substrate 12 and the electrodes 13, 14 as well as the protective coating 15 may be optically transmissive so that the liquid crystal device 10 is capable of controlling transmission of light therethrough in response to whether or not an electric field is applied across the electrodes 13, 14 and, thus, across the encapsulated liquid crystal 11. Alternatively, the mounting substrate 12 may be optically reflective (e.g. a mirror) or may have thereon an optically reflective coating so that reflection by such reflective coating of incident light received through the protective coating 15 will be a function of whether or not there is an electric field applied across the encapsulated liquid crystal 11. Several of these reflector alternatives are, as follows: The electrode 13 itself is optically reflective; a reflector is located between the substrate or support 12 and the electrode 13-in this embodiment both electrodes 13 and 14 would be transparent; the electrode is reflective, e.g. being of reflective electrically conductive ink.

Furthermore, the total internal reflection and/or interference principles with respect to light scattered by liquid crystal in the "field off" condition, as is disclosed in detail in the above application Ser. No. 477,138 are operable and useful in accordance with the present invention and are intended to be a part hereof, being specifically incorporated fully by reference; this embodiment is the preferred one according to the present invention. Using a reflector, for example, as is mentioned herein, it would be possible to obtain a bright output, such as a bright character, on a dark background when the liquid crystal used is placed on or relative to the support or mounting substrate 12 in patterned configuration. Moreover, if the electrode also were patterned, it would be possible to obtain either a bright character on a dark background or a dark character on a bright background, depending on the relationships of the components and how they are used.

A plurality of encapsulated liquid crystals 11 would be applied to the mounting substrate 12 in a manner such that the encapsulated liquid crystals adhere to the mounting substrate 12 or to an interface material, such as the electrode 13, for support by the mounting substrate 12 and retention in a fixed position relative to the other encapsulated liquid crystals 11. Most preferably the encapsulating medium 23 of which the capsule 22 is formed is also suitable for binding or otherwise adhering the capsule 22 to the substrate 12. Alternatively, a further binding medium (not shown) may be used to adhere the encapsulated liquid crystals 11 to the substrate 12. Since the capsules 22 are adhered to the substrate 12, and since each capsule 22 provides the needed confinement for the liquid crystal material 20, a second mounting substrate ordinarily would be unnecessary. However, for the purpose of providing protection from scarring, electrochemical deterioration, e.g. oxidation, or the like, of the electrode 14, a protective coating 15 may be provided on the side or surface of the liquid crystal device 10 opposite the mounting substrate 12, the latter providing the desired physical protection on its own side of the device 10.

Importantly, according to the invention, a spacer or filler 24 is included in the liquid crystal capsule, as is described in greater detail below.

Turning now to FIG. 2, an example of a liquid crystal device 10' in accordance with the invention is shown in the form of a liquid crystal display device, which appears as a square cornered figure eight 30 on the substrate 12, which in this case preferably is of a plastic material, such as Mylar, or may alternatively be another material, such as glass, for example. The shaded area appearing in FIG. 2 to form the square cornered figure eight is formed of plural encapsulated liquid crystals 11 arranged in one or more layers on and adhered to the substrate 12.

Figure 3:
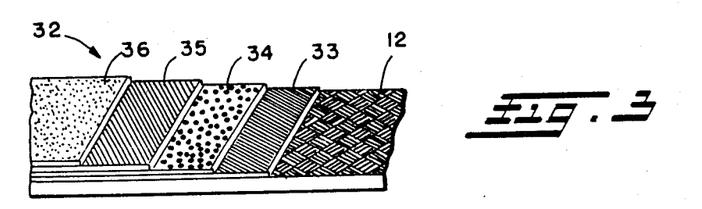
FIG. 3 is an enlarged fragmentary view, partly broken away, of a portion of the liquid crystal display device of FIG. 3.

An enlarged fragmentary section view of a portion 32 of the figure eight 30 and substrate 12 is illustrated in FIG. 3. As is seen in FIG. 3, on the surface 31 of the substrate 12, which may be approximately 10 mils thick, is deposited a 200 angstrom thick electrode layer 33. One or more layers 34 of plural encapsulated liquid crystals 11 are applied and adhered directly to the electrode layer 33. The thickness of the layer 34 may be, for example, approximately 0.3 to 10 mils, preferably 0.5 to 4 mils, more preferably 0.5 to 1.2 mils, especially about 0.5 to about 0.7 mil. Other thicknesses may also be used, depending inter alia on the ability to form a thin flim and the electrical breakdown properties of the film. A further electrode layer 35 is deposited on the layer 34 either directly to the material of which the capsules 22 are formed or, alternatively, to the additional binding material used to bind the individual encapsulated liquid crystals 11 to each other and to the mounting substrate 12. The electrode layer 35 may be, for example, approximately ½ mil thick. A protective coating layer 36 for the purpose described above with respect to the coating 15 in FIG. 3 also may be provided as is shown in FIG. 3.

In a conventional visual display device either of the liquid crystal or light emitting diode type, the figure eight element 30 ordinarily would be divided into seven electrically isolated segments, each of which may be selectively energized or not so as to create various numeral characters. For example, energization of the segments 30a and 30b would display the numeral "1", and energization of the segments 30a, 30b, and 30c would display the numeral "7".

Although a detailed description of the operation of the individual encapsulated liquid crystals 11 will be presented below, it will suffice here to note that the encapsulated liquid crystals in the layer 34 may function to attenuate or not to attenuate light incident thereon in dependence on whether or not an electric field is applied thereacross. When the liquid crystal material is used in such an attenuating/non-attenuating mode, preferably a pleochroic dye is present in solution in the liquid crystal material to provide substantial attenuation by absorption in the "field-off" condition but to be substantially transparent in the "field-on" condition. Such an electric field may be, for example, one produced as a result of the coupling of the electrode layer portions 33, 35 at an individual segment, such as segment 30a, of the liquid crystal device 10' to an electrical voltage source. The magnitude of the electric field required to switch the encapsulated liquid crystals 11 from a no field (deenergized) condition to a field-on (energized) condition may be a function of several parameters, including, for example, the diameter of the individual capsules and the thickness of the layer 34, which in turn may depend on the diameter of individual capsules 22 and the number of such capsules in the thickness direction of layer 34. Importantly, it will be appreciated that since the liquid crystal material 20 is confined in respective capsules 22 and since the individual encapsulated liquid crystals 11 are secured to the substrate 12, the size of the liquid crystal device 10' or any other liquid crystal device employing encapsulated liquid crystals in accordance with the present invention is virtually unlimited. Of course, at those areas where it is intended to effect a change in the optical properties of the encapsulated liquid crystals of such a device in response to a no field or field on condition, it would be necessary to have at such areas electrodes or other means for applying to such liquid crystals a suitable electric field.

Figure 4:
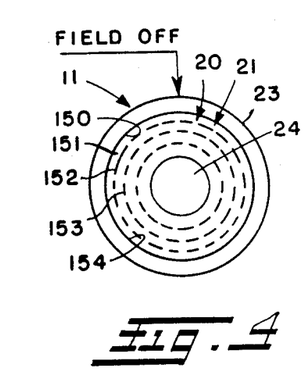
FIG. 4 is an enlarged schematic illustration of a liquid crystal capsule in accordance with the present invention under a no-field condition.
Figure 5:
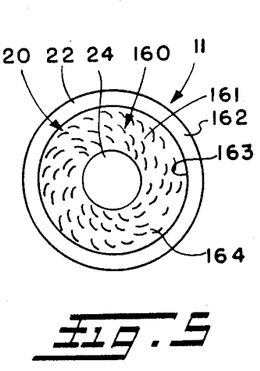
FIG. 5 is a schematic illustration like FIG. 9, for example, but showing alignment of the liquid crystal structure normal to the capsule wall and filler.
Figure 6:
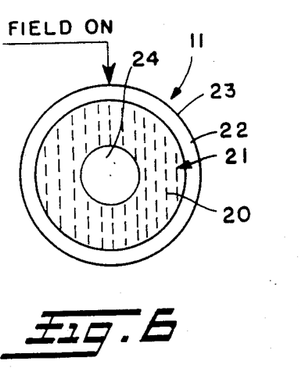
FIG. 6 is a schematic illustration of the capsules of FIGS. 4 and 5 under an applied electric field condition.

Turning now to FIGS. 4, 5 and 6, liquid crystal capsules 11a, 11b, 11c, include filler or spacer material 24, for example in the form of a small capsule of mineral oil or a glass bead. The filler material may be used an an extender in that it reduces the quantity of liquid crystal material required to fill the internal volume 21 of the capsule 22. Preferably the filler 24 is inert relative to the liquid crystal material 20 and preferably also relative to the encapsulating medium 23.

Not only does the filler 24 reduce the quantity of liquid crystal material required in the capsule, but also such filler preferably provides additional surface(s) to effect the desired curvilinear alignment of the liquid crystal material in the absence of an electric field. The distorted or curvilinear alignment of the liquid crystal structure generally in parallel with the various surfaces in the capsule 22 of FIG. 4 can be seen; and the orientation of the liquid crystal structure normal to such surface(s) in the field-off condition can be seen in the capsule 22 of FIG. 5. Preferably the filler 24 is curved, e.g. spherical. The curved external surface of such filler specifically assists in assuring the desired distortion or curvilinear alignment of the liquid crystal structure in the field-off condition as is seen in FIGS. 4 and 5.

Preferably, too, the filler is substantially or completely transparent to the electromagnetic radiation, for example light, with which the encapsulated liquid crystal or device employing the same is intended for use. Also, preferably the index of refraction of the filler, e.g. the mineral oil, outside encapsulating medium holding same, and/or glass beads, is the same as the ordinary index of refraction of the liquid crystal material. Therefore, in the field-on condition when the liquid crystal structure is aligned parallel to an electric field, as is shown, for example, in FIG. 6 (regardless of whether the liquid crystal material is of the type shown in FIG. 4 or 5), the light will not refract at the interface(s) of the liquid crystal material and the filler; and, therefore, in the field-on condition the filler may be effectively totally transparent in a way similar to that of the liquid crystal material vis-a-vis light transmitted therethrough. Indeed, it also is preferred that the filler has a uniform index of refraction and, therefore, it would be undesirable for glass beads filler to be hollow; for the refraction occurring at the interface of the glass bead material with the hollow interior thereof would detrimental to the direct transmission of light therethrough. However, if for some reason it were desired to have refraction at such internal interface of the filler, such hollow beads or filler having multiple indices of refraction may be employed consistent with the invention.

Since the liquid crystal material 20 in the capsules 22 is optically anisotropic, the extraordinary index of refraction thereof will be different from the index of refraction of the filler as long as the above ordinary index match is achieved. Therefore, in the field-off condition, in addition to the refraction occurring at the interface of the liquid crystal material and encapsulating medium, further (i.e. in addition to scattering occurring at the liquid crystal interface with the encapsulating medium 23) refraction and, therefore, scattering, is encountered at the interface of liquid crystal material and filler material. Such additional scattering may be used for a variety of purposes consistent with the invention, for example, to brighten the characters produced by a liquid crystal device employing the capsules 22 in the scattering mode of FIG. 7 described below or attenuation of light by absorption when pleochroic dye is included in the liquid crystal material.

The dielectric constant of the filler material may be selected to be relatively high, for example even higher than that of the liquid crystal material, to help assure that maximum voltage drop in the capsule occurs across the liquid crystal material and not across the filler material itself. Exemplary filler may be one or more beads of approximately 1 micron diameter employed in capsules that have an internal diameter on the order of about 3 to 6 microns. Moreover, if desired, the filler material may be colored in order to color, dye, tint, etc. light passing therethrough or to filter certain light components.

Use of high dielectric constant beads, mineral oil capsules or other filler material 24, as is described herein, may tend to increase the proportion of voltage drop across the liquid crystal material 20 when an electric field is applied, for example, to a layer 34 comprised of such capsules 22. Accordingly, the overall voltage requirement for a device employing such encapsulated liquid crystal material with such high dielectric constant filler therein may be reduced relative to the requirement in the absence of such a filler.

EXAMPLE 1

Capsules of mineral oil were formed on the order of 2 microns diameter using an inert encapsulant, e.g. gelatin, having substantially the same index of refraction as the mineral oil. Polyvinyl alcohol, operationally nematic liquid crystal and such mineral oil capsules were mixed to form an emulsion-like consistency. The emulsion was pulled in a relatively thin coating on a transparent glass slide. The polyvinyl alcohol was allowed to cure, hardening to form on the slide a layer of containment medium with plural volumes or capsules therein, many of which included an arrangement of liquid crystal 20, capsule 22 material and filler 24, e.g. as is illustrated in FIG. 4. With such encapsulated liquid crystal on such slide support, an electric field was applied across such encapsulated liquid crystal layer. At about 20 volts saturation occurred. Saturation is when the liquid crystal material is full on or transparent, in other words minimum scattering and/or absorption of light occurs and there is no significant change as the electric field is increased further.

EXAMPLE 2

The procedure of Example 1 was followed, except that glass beads were substituted for the mineral oil capsules. Results were substantially the same as in Example 1.

EXAMPLE 3

The procedure of Example 1 was followed, except that no filler was used. The results changed in that saturation occurred at about 40 volts.

Figure 7:
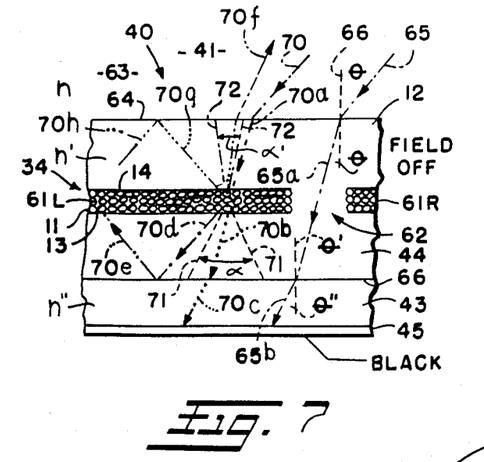
FIG. 7 is a schematic representation of a liquid crystal apparatus embodying scattering principle of operation and total internal reflection of scattered light in the field-off condition and light transmission in the fieldon condition.

Briefly referring to FIG. 7, which shows an example of the abovementioned scattering device of application Ser. No. 477,138, succinctly stated, such embodiment relates to the isotropic scattering of light by liquid crystal material and to the use of such isotropically scattered light to yield a white or bright appearance, character, information, etc., especially relative to background, when a liquid crystal material is in a field-off or distorted alignment condition and a colored or dark appearance, e.g. the same as background, when a liquid crystal material is in field-on parallel or ordered alignment condition. Preferably the liquid crystal material is nearly completely isotropically scattering when the distorted alignment. Isotropic scattering means that when a beam of light enters the liquid crystal material there is virtually no way to predict the exit angle of scattered light. As used herein, "isotropic scattering" means complete isotropic scattering in a totally random or unpredictable way or at least a substantial or reasonable amount of scattering, this being as opposed to absorption of light.

As seen in FIG. 7, a liquid crystal display 40 can produce relatively bright or white characters, information, etc., on a relatively dark background; the bright character is produced by liquid crystal material that is randomly aligned; the background is caused, for example, by liquid crystal material that is in ordered alignment and, thus, substantially optically transparent and/or by areas of the display where there is no liquid crystal material. When the liquid crystal material is in parallel or ordered alignment, only the relatively dark background, e.g., formed by an absorber or by a dark foreground reflected by a reflector, would appear. The foregoing is accomplished using illumination either from the viewing side 41 or direction or from the back or non-viewing side 42 of the display. The principles of the invention also may be used in an optical shutter or light control device to control brightness, for example.

The liquid crystal apparatus (FIG. 7) includes liquid crystal material 34 for selectively primarily scattering or transmitting light in response to a prescribed input and a containment, encapsulating or support medium 12 for holding therein the liquid crystal material, thus volumes of liquid crystal are in the medium 12. The volumes of liquid crystal material may be considered encapsulated liquid crystal that will cause substantially isotropic scattering of light incident thereon, including the scattering of some of such light back in the viewing direction toward, for example, the eye of an observer. Such liquid crystal is operationally nematic, has a positive dielectric anisotropy, and has an ordinary index of refraction that substantially matches that of the medium 12.

In one embodiment, a large quantity of light that is isotropically scattered by the liquid crystal material is totally internally reflected in medium 12 back to the liquid crystal material thereby illuminating the same and causing further isotropic scattering and brightening of the appearance of the liquid crystal material, for example to the eye of an observer. The internal reflectance characteristic of the medium 12 may be effected by an interface with another medium 43, such as a solid, liquid, or gas, even including air, with the constraint that the index of refraction of the support medium is greater than the index of refraction of such other medium. The support medium may be comprised of several components, including, for example, the containment/encapsulating material (or that with which the liquid crystal material is in emulsion), additional quantities of such encapsulating or other material, a mounting medium, such as a plastic-like film or glass, etc.

The back surface 44 of the support medium 12 may be optically transmissive so that light that reaches such surface in a direction substantially normal thereto wil be transmitted. A light absorbing black or colored material 45 beyond such back surface can help darken or color the apparent background on which the characters formed by liquid crystal material appear. Alternatively, as was mentioned above, a true reflector could be at or beyond, i.e. spaced from, the back surface of the suport medium. Ordered alignment of the liquid crystal material will at least substantially eliminate the isotropic scattering so that substantially all the light passing through the liquid crystal material will also pass through the back surface of the support medium.

It is significant to note that such an arrangement or pattern of encapsulated liquid crystal material layer portions, such as at 61L and 61R, separated at zone 62 by support medium 12 or other material is facilitated, or even made possible due to the encapsulating or confining of the liquid crystal in discrete containment media, such as is formed by the preferred stable emulsion. Therefore, especially on a relatively large size device such as a display, billboard, optical shutter, etc., encapsulated liquid crystal material may be applied to the support medium 12 only where it is required to provide the selectable optical characteristics.

The display 40 may be used, for example, in an air environment, such air being represented by the reference numeral 63, and the air forms an interface 64 at the viewing side or from the viewing direction 41 with the support medium 12. The index of refraction N of the external medium 63 is different from, usually smaller than, the index of refraction N' of the encapsulating and support medium 12. As a result, a beam of light 65, which arrives generally from the viewing direction 40, passing through the interface 64 into the support medium 12 will be bent toward the normal, which is an imaginary line 66 perpendicular to that interface 64. That light beam 65a inside the support medium 12 will be closer to normal than the incident beam 65 satisfying the equation relationship N Sine $\theta$ = N' Sine $\theta'$, wherein $\theta$ is the angle of the incident light beam 65 with respect to the normal and $\theta'$ is the angle of the light beam 65a with respect to normal. Such mathematical relationship will apply at the interface 66, as follows: N' Sine $\theta'$ = N'' Sine $\theta''$. To achieve the desired total internal reflection in accordance with the invention, the index of refraction N'' of the reflectance medium 43 is smaller than the index of refraction N' of the support medium 12. Accordingly, if the light beam 65a, for example, were able to and did pass through the interface 66, it would be bent away from the normal at the interface 66 to the angle $\theta''$ with respect to normal. Actually, since the light beam 65, 65a is not scattered off course by the liquid crystal material in layers 61, i.e., because it passes through the zone 62, it will indeed likely exit through the interface 66 as beam 65b for absorption by the absorber 45.

Continuing to refer particularly to FIG. 7, operation of a liquid crystal display 40 in accordance with the invention is now described. The operationally nematic liquid crystal 34 is in distorted or random alignment due to existence of a field-off condition. Incident light beam 70 enters the support medium 12 at the interface 64 and is bent as the light beam 70a that impinges as incident light on the layer 61L of encapsulated liquid crystal. The random or distorted encapsulated liquid crystal material will isotropically scatter the light incident thereon. Therefore, there are several possibilities of how such incident light beam 70a would tend to be scattered, as follows:

A. For example, one possibility is that the incident light beam 70a will be directed according to the dotted line 70b toward the interface 66. The angle at which the light beam 70b impinges on the interface 66 is within the illustrated solid angle $\alpha$ (defined in the planar direction of the drawing of FIG. 5 by the dashed lines 71) of a so-called cone of illumination. Light falling within such solid angle $\alpha$ or cone of illumination is at too small an angle with respect to normal at the interface 66 to be totally internally reflected at that interface; therefore, the light beam 70b will pass through interface 66 while bending away from the normal to form the light beam 70c. Light beam 70c passes into the reflectance medium 43 and is absorbed by layer 45.

B. Another possibility is that the light beam 70a will be isotropically scattered in the direction of the light beam 70d outside the cone angle $\alpha$. Total internal reflection will occur at the interface 66 causing the light beam 70d to be reflected as light beam 70e back to the layer 61L of encapsulated liquid crystal material where it will be treated as another independently incident light beam thereto, just like the light beam 70a from which it was derived. Therefore, such light beam 70e will undergo isotropic scattering again as is described herein.

C. Still another possibility is that the incident light beam 70a, or that derived therefrom, such as the light beam 70e, will be isotropically scattered toward the interface 64 at an angle that is so close to normal at that interface 64 that the light beam will pass through the interface 64 into the "medium" 63, such as the air, to be viewed by an observer or observing instrument. The solid angle$\alpha'$ of a cone of illumination, like the cone angle $\alpha$ mentioned above, within which such scattered light beam 70e must fall to be emitted out through the interface 64 is represented by the single dot phantom lines 72. Light beam 70f represents such a light beam that is so emitted from the display 60. It is that light, e.g. the sum of such emitted light beams 70f, which exits at the interface 64 that causes the layer 61 of encapsulated liquid crystals 11 to give the appearance of a white or bright character as viewed from the viewing direction 41.

D. Still a further possibility is that the light beam 70a may be isotropically scattered in the direction of the light beam 70g. Light beam 70g is outside the solid cone angle $\alpha'$ and, therefore, will undergo total internal reflection at the interface 64, whereupon the reflected beam 70h will impinge back on the layer 61L as an effectively independent incident light beam, like the beam 70e mentioned above and having a similar effect.

The index of refraction of the electrodes 13, 14 usually will be higher than that (those) of the containment medium and support medium and the containment and support media indices of refraction preferably are at least about the same. Therefore, the light passing from the containment medium into the electrode material will bend toward the normal, and that passing from the electrode into the support medium will bend away from the normal; the net effect of the electrode thus being nil or substantially negligible. Accordingly, the majority of total internal reflection will occur at the interfaces 64, 66.

In the field-on or ordered alignment condition and operation of the encapsulated liquid crystal layer 61 in the display device 60 the encapsulated liquid crystal 34 is optically transmissive. Therefore, like the light beam 65, 65a, 65b which passes through the zone 62 and is absorbed by the layer 45, a light beam 70, for example, transmitted through the aligned and, thus, effectively transparent or non-scattering layer 61 will pass through the interface 66 and will be absorbed by the layer 45, e.g. as is represented by beam 70c. Accordingly, whatever visual appearance the light beam 65 would tend to cause with respect to an observer at the viewing location 41, so too will the light beam 70 cause the same effect when passing through the orderly aligned encapsulated liquid crystal material. Thus, when the display 40, and particularly the encapsulated liquid crystal material therein, is in the orderly aligned or field-on condition, the area at which the liquid crystal is located will have substantially the same appearance as that of the zone 62.

Incident illumination for a liquid crystal display embodying the invention may be from the front or viewing side. Alternatively, incident illumination may be from the back side, preferably through a mask or director to direct light fully transmitted by the liquid crystal material out of the field or angle of view at the viewing side, as also is disclosed in application Ser. No. 477,138. However, light scattered by the liquid crystal material within the viewing angle would be seen.

Moreover, a cholesteric material or a chiral additive may be added to the nematic liquid crystal material to expedite return of the latter to distorted alignment pattern following in general the configuration of the capsule or cell wall when the electric field is turned off, especially when the capsules are relatively large. Also, if desired, a viscosity controlling additive may be mixed with the liquid crystal. Further, an additive to the liquid crystal may be used to help force a preferred alignment of the liquid crystal structure in a capsule, for example, to the normal alignment of FIG. 10, which is described further below.

Referring back to FIG. 4, the capsule 22 has a generally smooth curved interior wall surface 150 defining the boundary of the volume 21. The actual dimensional parameters of the wall surface 150 and of the overall capsule 22 are related to the quantity of liquid crystal material 20 contained therein. Additionally, the capsule 22 applies a force to the liquid crystals 20 tending to pressurize or at least to maintain substantially constant the pressure within the volume 21. As a result of the foregoing, and due to the surface wetting nature of the liquid crystal, the structure which ordinarily in free form would tend to be straight, although perhaps randomly distributed, is distorted to curve in a direction that generally is parallel to a relatively proximate portion of the interior wall surface 150. Due to such distortion the liquid crystals store elastic energy. For simplicity of illustration, and for facility of comprehending the foregoing concept, a layer 151 of liquid crystal molecules whose directional orientation is represented by respective dashed lines 152 is shown in closest proximity to the interior wall surface 150. The use herein of the word "molecules" is intended to be synonymous with liquid crystal "structure" since it often is the case in the art that it is the arrangement and/or configuration of the structure of the liquid crystal that has particular meaning and operational effect. Exemplary undistorted structure would be straight for operationally nematic liquid crystal. The directional orientation of the molecules or structure 152 is distorted to curve in the direction that is parallel to a proximate area of the wall surface 150. The directional pattern of the liquid crystal molecules away from the boundary layer 152 within the capsule is represented by dashed lines 153. The liquid crystal molecules are directionally represented in such layers, but it will be appreciated that the liquid crystal molecules themselves are not confined to such layers. Thus, the organization in an individual capsule is determined by the organization of the structure 152 at the surface 150 of the capsule or volume defining wall 154 and is fixed unless acted on by outside forces, e.g. an electric field. On removal of the field, the directional orientation would revert back to the original orientation such as that shown in FIG. 4. The filler 24 further enhances distortion of the liquid crystal structure by providing an additional curved surface 159 for interfacing with the liquid crystal.

In the preferred embodiment and best mode of the present invention the liquid crystal molecules 152 are of the nematic or operationally nematic type and have positive dielectric anisotropy. Such molecules or liquid crystal structure usually assume(s) a straight line configuration, and a liquid crystal material comprised of such nematic molecules usually is optical polarization direction sensitive. However, since the structure 152 in the encapsulated liquid crystal 11 is distorted or forced to assume a curved form in the full three dimensions of the capsule 22, such nematic liquid crystal material in such capsule takes on an improved characteristic of being insensitive to the direction of optical polarization of light incident thereon. When the liquid crystal material 20 in the capsule 22 has pleochroic dye dissolved therein, such dye, which ordinarily also would be expected to have optical polarization sensitivity, no longer is polarization sensitive because the dye tends to follow the same kind of curvature orientation or distortion as that of the liquid crystal structure.

With the liquid crystal structure being distorted to fold in on itself generally in the manner illustrated in FIG. 4, the encapsulated liquid crystal 11 ordinarily will absorb or block light from being transmitted therethrough, if pleochroic dye is included or will scatter light if pleochroic dye is not included, when no electric field is applied across the encapsulated liquid crystal 11 and particularly across the liquid crystal material 20 thereof.

Although the foregoing discussion has been in terms of a homogeneous orientation of the liquid crystal material (parallel to the capsule wall and filler surface), such is not a requisite of the invention. All that is required is that the interaction between the wall and surface and the liquid crystal produce an orientation in the liquid crystal near that wall that is generally uniform and piecewise continuous, so that the spatial average orientation of the liquid crystal material over the capsule volume is strongly curved and there is no substantial parallel directional orientation of the liquid crystal in the absence of an electric field. It is this strongly curved orientation that results in the absorption/scattering and polarization insensitivity in the field off condition, which is a feature of this invention. Thus, the normal alignment configuration of FIG. 5 also supplies such operational characteristics.

Briefly referring to FIG. 5, there is shown an alternate embodiment of encapsulated liquid crystal material 160, which may be substituted for the various other embodiments of the invention disclosed herein. The encapsulated liquid crystal material 160 includes operationally nematic liquid crystal material 161 in a capsule 162 having preferably a generally spherical wall 163. In FIG. 5 the material 160 is in field-off condition, and in that condition the structure 164 of the liquid crystal molecules is oriented to be normal or substantially normal to the wall 163 at the interface 165 or surface thereof and with surface 159 of filler 24. Thus, the structure 164 is generally oriented in a radial direction with respect to the geometry of the capsule 162. Moving closer toward the center of the capsule 162, the orientation of the structure 164 of at least some of the liquid crystal molecules will tend to curve in order to utilize, i.e. to fill, the volume of the capsule 162 with a substantially minimum free energy arrangement of the liquid crystal in the capsule, for example, as is seen in the drawing.

Such alignment is believed to occur due to the addition of an additive to the liquid crystal material 161 which reacts with the support medium to form normally oriented steryl or alkyl groups at the inner capsule wall. More particularly, such additive may be a chrome steryl complex or Werner complex that reacts with PVA of the support medium (12) that forms the capsule wall 163 to form a relatively rigid crust or wall with a steryl group or moeity tending to protrude radially into the liquid crystal material itself. Such protrusion tends to effect the noted radial or normal alignment of the liquid crystal structure. Moreover, such alignment of the liquid crystal material still complies with the above strongly curved distortion of the liquid crystal structure in field-off condition because the directional derivatives taken at right angles to the general molecular direction are non-zero.

Figure 11:
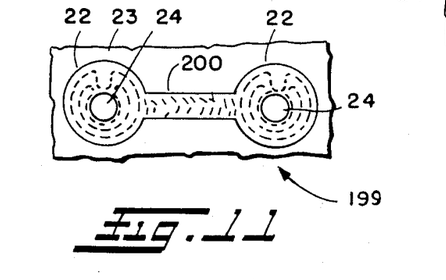
FIGS. 11, 12 and 13 are schematic illustrations of pairs of interconnected capsules.

When an electric field is applied across the encapsulated liquid crystal 11, whether of the parallel or normal relative to the capsule walls arrangements of FIGS. 4 or 5, in the manner illustrated in FIG. 11, the liquid crystal and any pleochroic dye in solution therewith will align in response to the electric field in the manner shown in such figure. Such alignment results in a reduction of light attenuation by the liquid crystal; indeed such alignment preferably permits light to be transmitted through the encapsulated liquid crystal 11.

In the field off condition, since the liquid crystal structure is distorted to a curved form (hereinafter curvilinearly aligned form), the structure has a certain elastic energy. Such elastic energy causes the crystals to function to do things that otherwise would not be possible when the liquid crystal structure assumes its ordinary linear form. For example, the tangential or parallel alignment of the liquid crystal structure to respective portions of interior wall surface 150 and to filler 24 both cause scattering and absorption within the capsule 22. On the other hand, when the electric field is applied in the manner illustrated in FIG. 6, the liquid crystal aligns as shown being dominated by the electric field.

To optimize the contrast characteristics of a liquid crystal device, such as that shown at 10' in FIG. 3 or at 40 in FIG. 7, comprised of encapsulated liquid crystals 11, and more particularly, to avoid optical distortion, due to refraction of incident light passing from the encapsulating medium into the liquid crystal material and vice versa, of the encapsulated liquid crystal 11, the index of refraction of the encapsulating medium and that the ordinary index of refraction of the liquid crystal material should be matched so as to be as much as possible the same. The closeness of the index matching will be dependent on the desired degree of contrast and transparency in the device, but the ordinary index of refraction of the crystal and the index of the medium will preferably differ by no more than 0.07, more preferably 0.01, especially 0.001. The tolerated difference will depend on capsule size and intended use of the device. The text "Optics" by Sears, published by Addison-Wesley, contains a thorough discussion of birefringence relevant to the foregoing, and the relevant portions of such text are incorporated herein by reference.

However, when no field is applied there will be a difference in indices of refraction at the boundary of the liquid crystal and capsule wall due to the extraordinary index of refraction of the liquid crystal being greater (in any event different) than the encapsulating medium. This causes refraction at the interface or boundary and thus further scattering, preferably isotropic scattering, and is a reason why encapsulated nematic liquid crystal material in accordance with the present invention, in particular, will function to prevent transmission of light even without the use of pleochroic dye. Indeed, such scattering in field off curvilinearly aligned condition of the liquid crystal material enables output of a bright character on a dark background in the scattering embodiment 40 of FIG. 7.

It is important that electrical field E is applied to the liquid crystal material 20 for the most part rather than being dissipated or dropped substantially in the encapsulating material of which the capsule itself is formed. In other words, it is important that there not be a substantial voltage drop across or through the material of which the wall 154 of the capsule 22 is formed, for example; rather, the voltage drop should occur predominantly across the liquid crystal material 20 within the volume 21 of the capsule 22.

The filler 24 also should have electrical properties such that the same helps assure application of a maximum amount of the electric field across the liquid crystal, thus improving efficiency of operation and minimization of voltage to achieve saturation and/or turning on, i.e. commencing of alignment of the liquid crystal structure.

The capsules 22 may be of various sizes. The smaller the capsule size, though, the higher the requirements will be for the electric field to effect alignment of the liquid crystal molecules in the capsule. Also, when the capsule size is relatively small, more capsules are required per unit area of the layer 34, and, therefore, more electric voltage drop losses will occur in the encapsulating medium than for larger size capsules, the density per unit area of which would be smaller. According to a preferred embodiment and best mode of the present invention, a device made with the encapsulated liquid crystals 11, such as the liquid crystal device 10' (e.g. FIG. 3), should use capsules of uniform size so that the device 10' can be energized or deenergized in a relatively uniform and well controlled manner. In contrast, when the capsules are of a non-uniform size, then non-uniform energization of the respective capsules, i.e. alignment of the liquid crystal molecules of each, would occur upon application of the electric field. Ordinarily the capsules 22 should have a size on the order of from about 0.5 micron to about 30 microns and more preferably about 1 to about 5 microns in diameter but larger and/or smaller capsules may be used.

The larger the capsule size, the smaller the electric field required to effect alignment of the liquid crystal molecules therein. However, the larger the sphere, the longer the response time. A person of ordinary skill in the art should have no difficulty, having regard to this disclosure, in determining a suitable or optimum capsule size for a given application.

An exemplary preferred liquid crystal material is nematic material the 40% material below. Other liquid crystal materials may be esters or mixtures thereof, biphenyls or mixtures thereof, and the like, such as E-7, E-11, E.63, ZLI-2344, and ZLI-2392, as supplid by E. Merck Chemicals, Darmstadt, West Germany. Four formulations or recipes of exemplary liquid crystal materials useful according to the invention are, as follows:

10% Material

Pentylphenylmethoxy Benzoate: 54 grams
Pentylphenylpentyloxy Benzoate: 36 grams
Cyanophenylpentyl Benzoate: 2.6 grams
Cyanophenylheptyl Benzoate: 3.9 grams
Cyanophenylpentyloxy Benzoate: 1.2 grams
Cyanophenylheptyloxy Benazoate: 1.1 grams
Cyanophenyloctyloxy Benzoate: 0.94 grams
Cyanophenylmethoxy Benzoate: 0.35 grams 20% Material Pentylphenylmethoxy Benzoate: 48 grams
Pentylphenylpentyloxy Benzoate: 32 grame
Cyanophenylpentyl Benzoate: 5.17 grams
Cyanophenylheptyl Benzoate: 7.75 grams
Cyanophenylpentyloxy Benzoate: 2.35 grams
Cyanophenylheptyloxy Benzoate: 2.12 grams
Cyanophenyloctyloxy Benzoate: 1.88 grams Cyanophenylmethoxy Benzoate: 0.705 grams

40% Material

Pentylphenylmethoxy Benzoate: 36 grams
Pentylphenylpentyloxy Benzoate: 24 grams
Cyanophenylpentyl Benzoate: 10.35 grams
Cyanophenylheptyl Benzoate: 15.52 grams
Cyanophenylpentyloxy Benzoate: 4.7 grams
Cyanophenylheptyloxy Benzoate: 4.23 grams
Cyanophenyloctyloxy Benzoate: 3.76 grams
Cyanophenylmethoxy Benzoate: 1.41 grams

40% MOD

Pentylphenylmethoxy Benzoate: 36 grams
Pentylphenylpentyloxy Benzoate: 24 grams
Cyanophenylpentyl Benzoate: 16 grams
Cyanophenylheptyl Benzoate: 24 grams Examples of pleochroic dyes that may suitably be used in the encapsulated liquid crystals 11 in accordance with the present invention are indophenol blue, Sudan black B, Sudan 3, and Sudan 2, and D-37, D-43 and D-85 by E. Merck identified above.

Various resins, gelatin, and/or polymers may be used as the encapsulating medium. Examples and properties are in the above patent and applications.

However, an encapsulating medium according to a preferred embodiment and best mode of the present invention when the encapsulation is performed by emulsification is polyvinyl alcohol (PVA), which has been found to have the desired properties mentioned above, especially in relation to the above described preferred liquid crystal and pleochroic dye maerial. Specifically, PVA has a good, relatively high, dielectric constant and has an index of refraction that is relatively closely matched to that of the preferred liquid crystal material. Gelatin and latex materials are other examples useful as an encapsulating or containment medium.

An emulsion method for making encapsulated liquid crystals 11 may include mixing together the encapsulating medium, filler 24, the liquid crystal material (including, if used, the pleochroic dye material), and perhaps a carrier medium, such as water. Mixing may occur in a variety of mixer devices, such as a blender, a colloid mill, which is most preferred, or the like. What occurs during such mixing is the formation of an emulsion of the ingredients, which subsequently can be dried eliminating the carrier medium, such as water, and satisfactorily curing the encapsulating medium, such as the PVA. Although the capsule 22 of each thusly made encapsulated liquid crystal 11 may not be a perfect sphere, each capsule will be substantially spherical in configuration because a sphere is the lowest free energy state of the individual droplets, globules or capsules of the emulsion, both when originally formed and after drying and/or curing has occurred.

It will be appreciated that since the uncured capsules or droplets of encapsulating medium and liquid crystal material are carried in a liquid, various conventional or other techniques may be employed to grade the capsules according to size so that the capsules can be reformed if of an undesirable size by feeding again through the mixing apparatus, for example, and so that the finally used capsules will be of a desired uniformity for the reasons expressed above.

Although the encapsulation technique has been described in detail with reference to emulsification, since the fact that the encapsulant material and binder are the same makes facile the production of liquid crystal devices; the preparation of discrete capsules of the liquid crystal material may on occasion be advantageous, and the use of such discrete capsules (with a binder) is within the contemplated scope of this invention.

Although the presently preferred invention operates in response to application and removal of an electric field, operation also may be effected by application and removal of a magnetic field.

Figure 8:
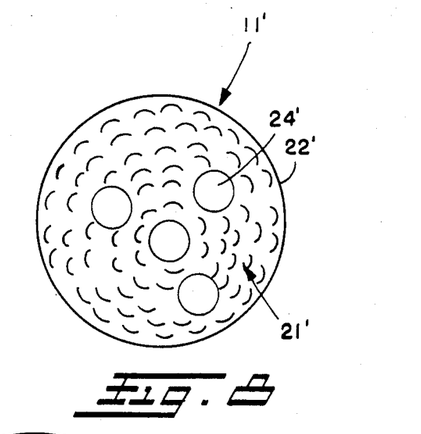
FIGS. 8, 9 and 10 are illustrations similar to those of FIGS. 4, 5 and 6 but showing an alternate embodiment of the invention using plural spacers in the capsules.
Figure 9:
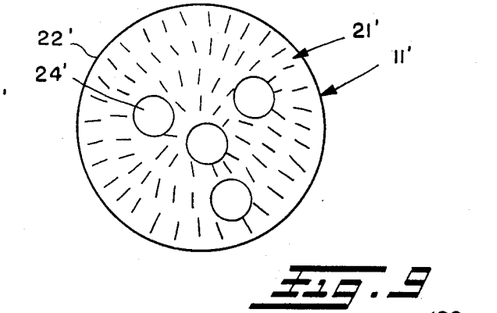
Figure 10:
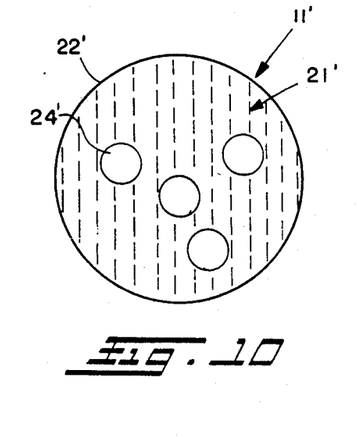

Briefly referring to FIGS. 8, 9 and 10, the alternate embodiments of encapsulated liquid crystal 11', including respective capsules 22' with liquid crystal 20' and plural fillers or spacers 24' in the volume 21', are shown. The difference between the embodiments of FIGS. 8-10 and the embodiments of FIGS. 4-6 is that in the encapsulated liquid crystal 11' capsules 22' there are plural fillers or spacers 24' in the respective volumes 21'. Operation would be substantially similar to operation of the embodiments shown in FIGS. 4-6.

Figure 12:
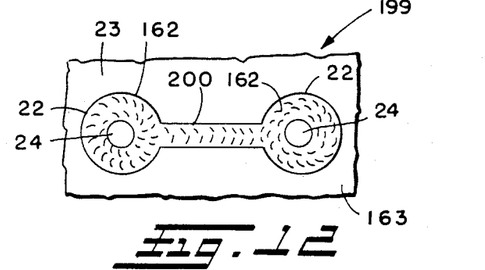
Figure 13:
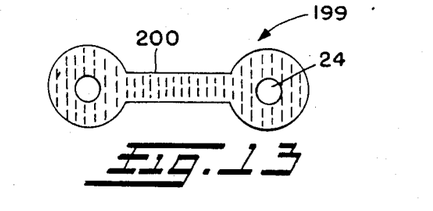

Turning now to FIGS. 11, 12, and 13, interconnected volumes of liquid crystal generally are shown at 199. To form such interconnected volumes 199 the interconnecting paths 200 between respective liquid crystal particles or capsules 22, that may be used to form a layer 34 (FIG. 3) are shown. The interconnecting passages 200 actually occur relatively randomly. Some capsules may not be interconnected to others, while some capsules may be interconnected by one or more passages 200 to one or more other capsules. The interconnections can be continuous or substantially continuous in the layer 34, for example, or may be discontinuous. It is believed that the existence or not of the passages 200 may depend on the method and/or conditions of manufacturing the encapsulated liquid crystal material and/or the placing thereof in the layer 34.

Regardless of whether or not such passages 200 occur in the layer 34, for example, operability of the encapsulated liquid crystal material and a device employing the same still would be based on the above described parameters and/or characteristics. Specifically, it is important that the ordinary index of refraction of the liquid crystal material be matched so as to be substantially identical to the index of refraction of the encapsulating medium to achieve maximum transparency or at least to minimize optical attenuation, scattering, absorption, etc., in the presence of an electric field; and there should not be a match of the extraordinary index of refraction of the liquid crystal material with respect to the index of refraction of the containment medium so that in the field-off condition scattering and/or absorption are maximized.

In FIGS. 11 and 12 the distorted, curvilinearly aligned liquid crystal material is shown in the parallel to the capsule wall or normal to the capsule wall orientations, respectively, of, for example, the capsules 22. The interconnecting passage 200 may have liquid crystal material aligned normal or parallel to the wall of such passage. The overall containment medium 23 in which the capsules 22 are formed are partially shown in FIGS. 11 and 12.

In FIG. 13 the application of an electric field E to the capsules 22 and passage 200 of FIGS. 11 and 12 is represented. In response to application of that electric field, the liquid crystal structure aligns with the field thereby reducing optical attenuation and, more particularly, increasing transmission, for example as was described in greater detail above. It will be clear from FIGS. 11, 12 and 13 that the existence of the passages 200 will not have any effect on transmission or attenuation. More specifically, in the field-off condition, the liquid crystal in the passages 200 will tend to absorb (especially if dye is included therewith) and/or to scatter light incident thereon because the structure of such liquid crystal will be generally distorted or the liquid crystal material will be randomly oriented in such passage. However, upon the application of the electric field E in FIG. 14 the liquid crystal material in the passage 200 aligns with the field and, therefore, such liquid crystal effectively becomes transparent, especially if the ordinary index of refraction thereof is substantially the same, preferably identical, to the index of refraction of the containment medium.

In conclusion it will be appreciated that the various features of the present invention described in detail above and illustrated in the several figures of the drawings may be employed in a variety of liquid crystal devices, such as displays, optical shutters, light control devices, etc. The various features disclosed in the several embodiments may be employed with each other or independently. Pleochroic dye or other dye may be used in accordance with the invention to help effect absorption in the field-off condition and to reduce attenuation of the electromagnetic radiation in the field-on condition; pleochroic dye tends to assume the structure of the adjacent or mixed molecules or structure of the liquid crystal material, especially of the operationally nematic type. Various additives may be employed to force twists, to force return of the liquid crystal material back to the field-off condition promptly upon removing the electric field, and so on.

I claim:

1. In combination, liquid crystal material having a natural structure, containment means for containing said liquid crystal material in a plurality of volumes, spacer means for occupying some of the space in a plurality of said volumes, at least one of said containment means and spacer means distorting such natural structure of at least some of said liquid crystal material in the absence of a prescribed input.

2. Liquid crystal apparatus, comprising liquid crystal material, containment medium containing plural volumes of said liquid crystal material, and non-liquid crystal filler in a plurality of said volumes, said liquid crystal material comprising operationally nematic liquid crystal having positive dielectric anisotropy, an extraordinary index of refraction different from that of at least one of said containment medium and filler to at least one of scatter and absorb light in the absence of a prescribed input and an ordinary index of refraction matched to that of at least one of said containment medium and filler, whereby in the presence of such prescribed input the amount of such scattering or absorption is reduced.

3. Liquid crystal apparatus comprising a plurality of volumes of liquid crystal in a containment medium, said liquid crystal being distorted from the natural structure thereof in the absence of an electrical input to scatter or to abosrb light and being responsive to such an electrical input to reduce such scattering or absorption, and means in said volumes for reducing the magnitude of electrical input required to effect a desired amount of reduction of such scattering or absorption.

4. Liquid crystal apparatus, comprising plural volumes of liquid crystal in a containment medium, said liquid crystal having positive dielectric anisotropy, an extraordinary index of refraction different from the index of refraction of such containment medium to scatter or to absorb light in the absence of a prescribed input, and an ordinary index of refraction substantially matched to the index of refraction of said containment medium to reduce such scattering or absorption in the presence of such prescribed input, and further comprising filler means in said volumes in addition to said liquid crystal and having an index of refraction that is substantially matched to the ordinary index of refraction of said liquid crystal and different from the extraordinary of said liquid crystal to increase scattering of light in the absence of such prescribed input and to have a relatively minimum affect on light in the presence of such prescribed input.

5. A method of affecting the natural structure of liquid crystal material comprising containing such liquid crystal material in a plurality of volumes, using a spacer to occupy some of the space in a plurality of such volumes, and using at least one of the walls of such volumes and such spacer distorting such natural structure of at least some of such liquid crystal material in the absence of a prescribed input.

6. A method of scattering or absorbing selected amounts of light using liquid crystal apparatus, comprising containing liquid crystal material in plural volumes, and providing non-liquid crystal filler in a plurality of said volumes, wherein such liquid crystal material comprises operationally nematic liquid crystal having positive dielectric anisotropy, an extraordinary index of refraction different from that of at least one of said containment medium and filler, at least one of scattering and absorbing light in the absence of a prescribed input and an ordinary index of refraction matched to that of at least one of said containment medium and filler, whereby in the presence of such prescribed input the amount of such scattering or absorption is reduced.

7. A method of reducing the electrical input requirements for operating a liquid crystal apparatus, comprising providing a plurality of volumes of liquid crystal in a containment medium, distorting such liquid crystal from the natural structure thereof in the absence of an electrical input to scatter or to absorb light, such liquid crystal being responsive to such an electrical input to reduce such scattering or absorption, and placing spacer means in such volumes to reduce the magnitude of electrical input required to effect a desired amount of reduction of such scattering or absorption.

8. A method of enhancing the scattering or absorption by liquid crystal while reducing the amount of liquid crystal required to affect light, comprising providing plural volumes of liquid crystal in a containment medium, such liquid crystal having positive dielectric anisotropy, an extraordinary index of refraction different from the index of refraction of such containment medium to scatter or to absorb light in the absence of a prescribed input, and an ordinary index of refraction substantially matched to the index of refraction of such containment medium to reduce such scattering or absorption in the presence of such prescribed input, and further comprising providing filler means in such volumes in addition to such liquid crystal and having an index of refraction that is substantially matched to the ordinary index of refraction of such liquid crystal and different from the extraordinary of such liquid crystal to increase scattering of light in the absence of such prescribed input and to have a relatively minimum affect on light in the presence of such prescribed input.

* * * * *